United States Patent
Azpeitia Urrestarazu (10) Patent No.: US 8,393,084 B2
(45) Date of Patent: Mar. 12, 2013

(54) ADJUSTMENT DEVICE FOR MANUAL CUTTING TOOLS

(75) Inventor: José María Azpeitia Urrestarazu, Legazpia (ES)

(73) Assignee: Bellota Herramientas, S.A., Legazpia (Guipuzcoa) (ES)

( * ) Notice: Subject to any disclaimer, the term of this patent is extended or adjusted under 35 U.S.C. 154(b) by 533 days.

(21) Appl. No.: 12/526,537

(22) PCT Filed: Jan. 28, 2008

(86) PCT No.: PCT/ES2008/000042
§ 371 (c)(1),
(2), (4) Date: Nov. 16, 2009

(87) PCT Pub. No.: WO2008/099033
PCT Pub. Date: Aug. 21, 2008

(65) Prior Publication Data
US 2010/0107422 A1    May 6, 2010

(30) Foreign Application Priority Data
Feb. 16, 2007 (ES) ................ 200700332 U (51) Int. Cl.
*B26B 13/28* (2006.01)

(52) U.S. Cl. ............... 30/254; 30/266; 30/270

(58) Field of Classification Search .......... 411/433, 411/437, 278, 279; 30/254, 266–270
See application file for complete search history.

(56) References Cited

U.S. PATENT DOCUMENTS

| 280,047 | A | * | 6/1883 | Kully ............................ 30/266 |
| 326,485 | A | * | 9/1885 | Dufrane ........................ 30/268 |
| 417,031 | A | * | 12/1889 | Houck .......................... 30/261 |
| 474,284 | A | * | 5/1892 | Berridge ....................... 30/266 |
| 573,075 | A | * | 12/1896 | Dohnal ......................... 30/269 |
| 613,687 | A | * | 11/1898 | Krueger ........................ 30/266 |

(Continued)

FOREIGN PATENT DOCUMENTS

BE            493829        6/1950
CN     101657088 A *    2/2010

(Continued)

OTHER PUBLICATIONS

International Search Report issued Jun. 20, 2008 in International (PCT) Application No. ES2008/000042.

*Primary Examiner* — Jason Daniel Prone
(74) *Attorney, Agent, or Firm* — Wenderoth, Lind & Ponack, LLP.

(57) ABSTRACT

An adjustment device for manual cutting tools is provided. The cutting tool for which the device is intended takes the form of pruning shears having two arms with the respective cutting blades thereof hinged to one another by a transverse bolt forming the main element of the device. A tightened nut for locking the bolt is provided with a transverse hole into which a lateral locking screw is screwed, thereby enabling the hinge to be adjusted. The nut and the locking screw are positioned in a recess in the cutting blade such that the nut cannot rotate when the bolt is being manipulated using a protrusion of the nut housed in a cavity in the cutting blade. The through-hole provided in the cutting blade for the bolt includes a bushing which enables the bolt to be better adjusted in the hole.

11 Claims, 7 Drawing Sheets

U.S. PATENT DOCUMENTS

| | | | |
|---|---|---|---|
| 663,208 A * | 12/1900 | Wrensch | 411/433 |
| 838,504 A * | 12/1906 | Hammond | 30/270 |
| 846,868 A * | 3/1907 | Sevic | 30/270 |
| 951,236 A * | 3/1910 | Crider | 30/266 |
| 1,539,826 A * | 6/1925 | Boutelle | 30/266 |
| 1,857,493 A * | 5/1932 | Campaigne | 30/94 |
| 1,951,581 A * | 3/1934 | Smith et al. | 411/433 |
| 1,987,935 A * | 1/1935 | Herrick | 30/268 |
| 2,741,843 A * | 4/1956 | Sejman et al. | 30/266 |
| 2,939,215 A * | 6/1960 | Putsch et al. | 30/266 |
| 3,237,665 A | 3/1966 | Bass | |
| 3,602,074 A * | 8/1971 | Smith | 30/266 |
| 3,882,599 A * | 5/1975 | Plum | 30/270 |
| 4,104,794 A * | 8/1978 | Carroll | 30/268 |
| 4,556,352 A * | 12/1985 | Resnicow | 411/433 |
| 4,584,770 A * | 4/1986 | Sabol | 411/437 |
| 4,882,959 A * | 11/1989 | Sakai | 30/266 |
| 4,978,261 A * | 12/1990 | Wright, III | 411/433 |
| 5,032,048 A * | 7/1991 | Walton et al. | 411/433 |
| 5,987,755 A * | 11/1999 | Shih | 30/254 |
| 6,128,943 A | 10/2000 | Lemmens | |
| 6,453,561 B1 * | 9/2002 | Chou | 30/266 |
| 6,725,547 B2 * | 4/2004 | Wu | 30/254 |
| 6,799,930 B1 * | 10/2004 | More et al. | 411/433 |
| 7,338,246 B2 * | 3/2008 | Caspi | 411/437 |
| 7,454,838 B2 * | 11/2008 | Gianola | 30/266 |
| 8,122,797 B2 * | 2/2012 | Bruurs | 30/254 |
| 2005/0044724 A1 * | 3/2005 | Lin | 30/266 |
| 2008/0301951 A1 * | 12/2008 | Lai | 30/254 |
| 2009/0056147 A1 * | 3/2009 | Zeng | 30/269 |
| 2011/0203117 A1 * | 8/2011 | Huang | 30/254 |

FOREIGN PATENT DOCUMENTS

| | | | |
|---|---|---|---|
| EP | 2110016 A1 * | 10/2009 | |
| ES | 1064828 U * | 5/2007 | |
| JP | 02111390 A * | 4/1990 | |
| MX | 2009008432 A * | 8/2009 | |
| RU | 2009134318 A * | 3/2011 | |
| WO | 03/080298 | 10/2003 | |
| WO | WO 2008099032 A1 * | 8/2008 | |
| WO | WO 2008099033 A1 * | 8/2008 | |

* cited by examiner

ADJUSTMENT DEVICE FOR MANUAL CUTTING TOOLS

OBJECT OF THE INVENTION

As stated in the title of this descriptive specification, the present invention relates to an adjustment device for manual cutting tools, intended preferably and fundamentally for its application in pruning shears and similar, with the aim of achieving an easy working in the operations required for carrying out the adjustment of the means of hinging which connects the two cutting pieces or blades established in the tool, without any need for special tools or devices, being based on a simple structure.

BACKGROUND OF THE INVENTION

As is conventional, the hinge between the cutting blades of a manual cutting tool, as in the specific case of pruning shears, both those that are workable with one hand and those workable with two hands, is created by means of a bolt which traverses the two blades or counter-blades of the tool, with a retaining nut collaborating with that bolt and which prevents the said blades or counter-blades from coming loose or separating, furthermore defining the means of adjustment of the actual hinge.

Moreover, in order to prevent the bolt from rotating and becoming slack, it has flat faces or additional cotters since the adjustment is done by rotating the nut.

Other means or systems are also known in which the retention of the nut is done by means of using self-locking nuts or even by means of incorporating certain additional pieces or elements, which implies a greater complexity and, more importantly, a greater difficulty for the user when it comes to adjusting the tightness of the tool under consideration, making it necessary to use special tools or devices for being able to carry out the adjustment operations on the corresponding hinge, in the event of incorporating additional pieces or elements.

DESCRIPTION OF THE INVENTION

The adjustment device of the invention presents certain characteristics on the basis of which the adjustment can be carried out quickly and easily on the tightness of a cutting tool, such as might be a pair of pruning shears, whether it is workable with one hand or with two, with the particular feature that the operation is carried out by means of a simple tool that is commercially available without any need for special tools or devices as is usually the case conventionally.

In that regard, the device in question is designed starting with a bolt which is made to pass through a hole created for the purpose in both the blade and the cutting counter-blade of the tool, or as the case might be in the support for those cutting blades, as is required in pruning shears that are workable with just one hand. Said bolt has a head at one of its ends which acts as a buffer against the outer surface of the cutting blade of the tool, and, as the case might be, of the support for that cutting blade, while the opposite end has a threaded section for a split nut, by means of which the corresponding locking is achieved in order to prevent the bolt from exiting. Said nut is complemented with a locking screw which fits into a threaded lateral hole made in the actual nut, perpendicular to the cut creating the partition of the latter, in order to achieve the locking of the bolt.

Fitted in the hole of the cutting blade of the tool, or, as the case might be, of the support for that blade, is a bush in order to improve the passage and adjustment of the bolt on that hole.

Moreover, provision has been made for the outer face of the cutting counter-blade or, as the case might be, of the support for that counter-blade, to have a recess for positioning of the nut and the locking screw, with the particular feature that said nut is provided with a protrusion or stud that is housed in a cavity made in the counter-blade or support for the counter-blade, in order to enable the rotation of that nut when the bolt is operated on and thereby achieve a better adjustment of the tightness of the hinge defined by the bolt.

Finally, the device as a whole presents the characteristic that both the head of the bolt and the head of the tightening screw have the same size slot, thereby avoiding having to use more than one tool for carrying out the tightening or slackening of those elements (bolt and locking screw), an advantage to which can be added the simplicity and ease of operation of the elements or pieces intervening in the overall device.

BRIEF DESCRIPTION OF THE DRAWINGS

In order to complement the description that is going to be made forthwith, and with the aim of facilitating a better understanding of the characteristics of the invention, this descriptive specification is accompanied by a set of drawings on the basis of which the innovations and advantages of the invention will be more easily understood.

DESCRIPTION OF THE PREFERRED FORM OF EMBODIMENT

Figure 1:
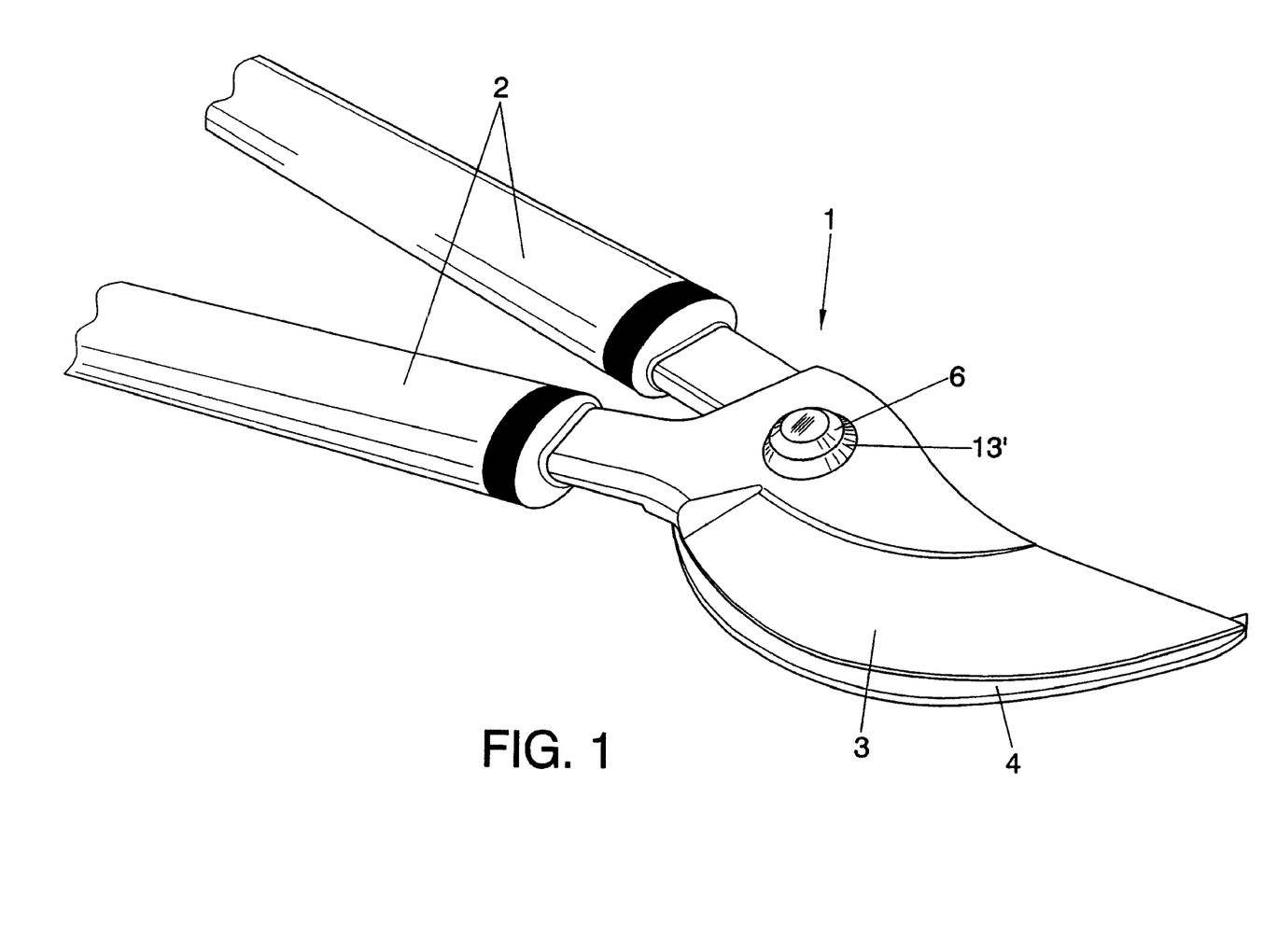
FIG. 1.—Shows a general perspective view of the pruning shears workable by means of two hands, with the device of the invention.
Figure 2:
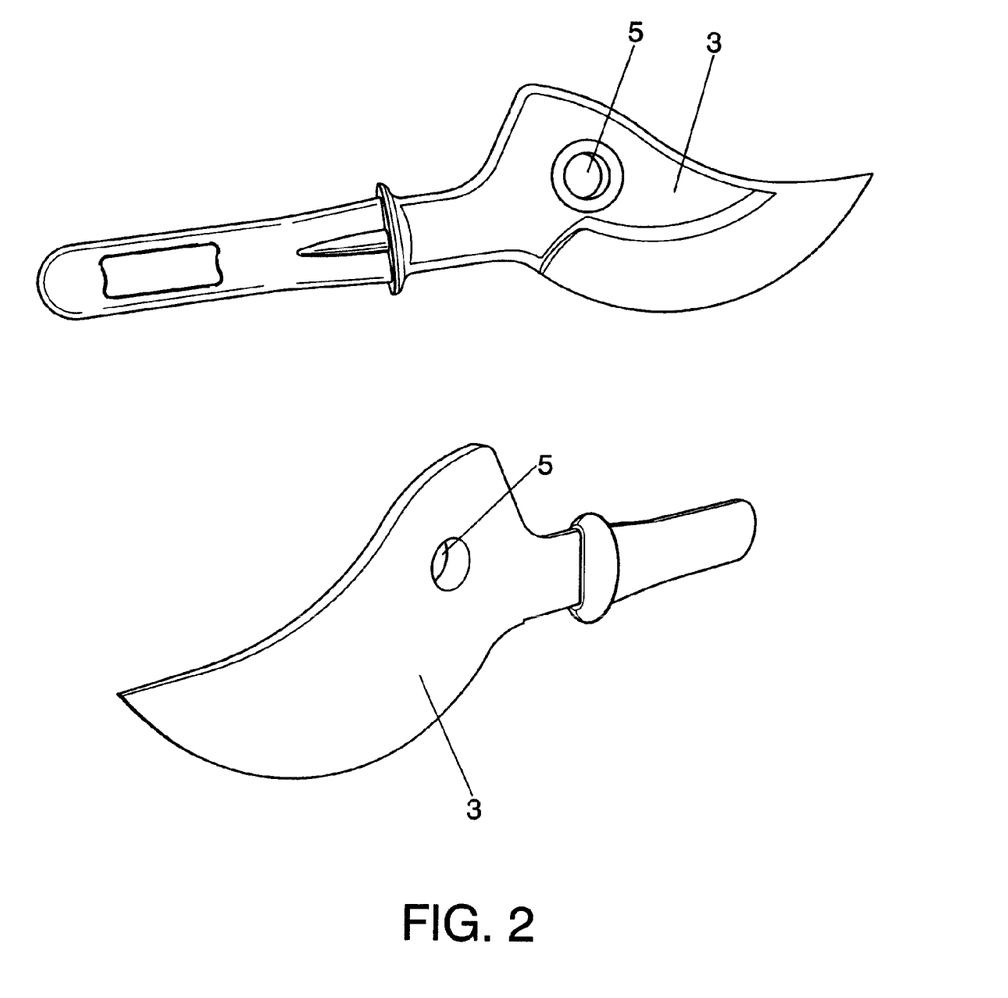
FIG. 2.—Shows perspective views from both sides of the cutting blade of the shears represented in the above figure.
Figure 11:
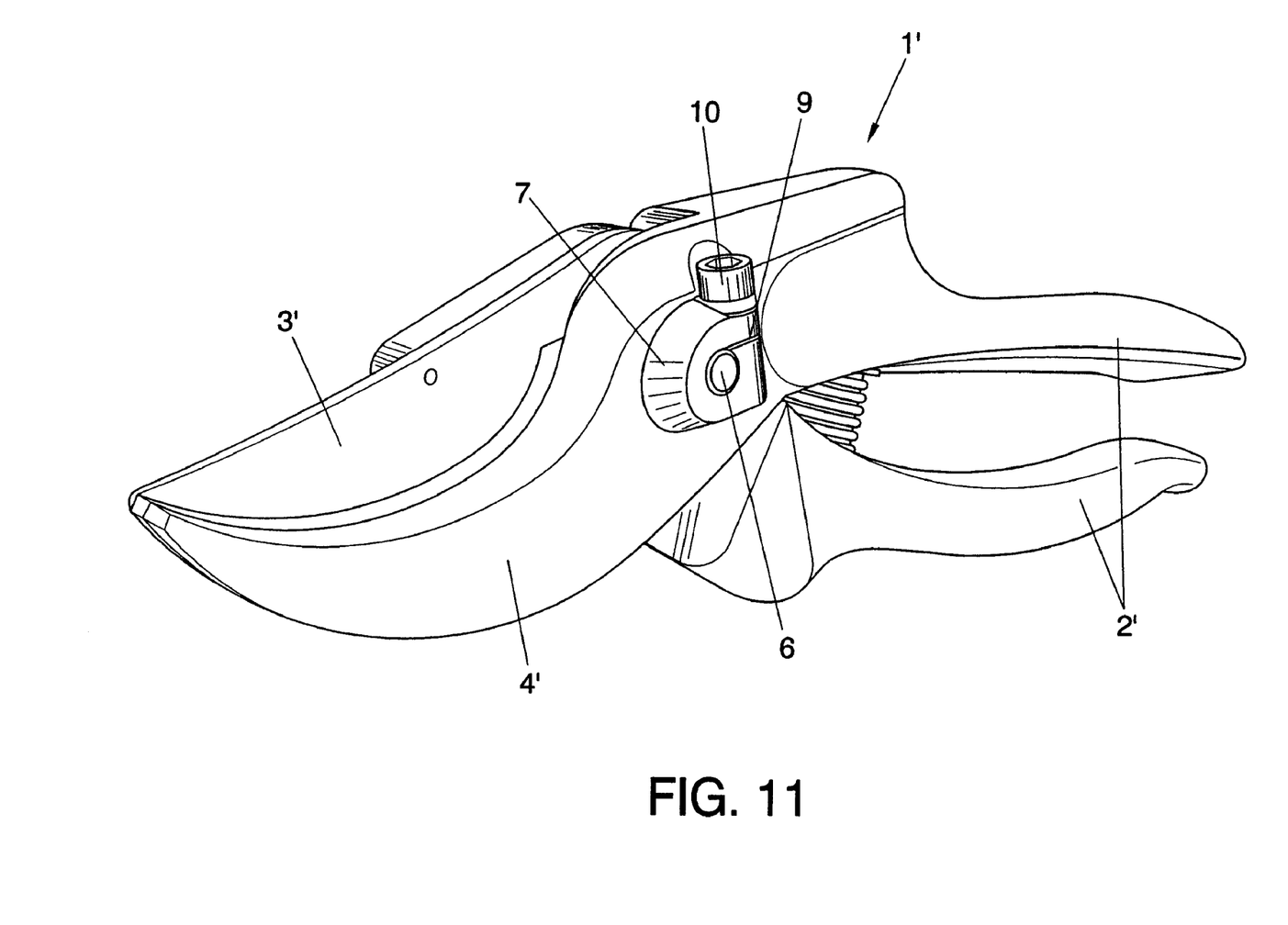
FIG. 11.—Shows a perspective view of a pair of pruning shears workable by means of just one hand, with the same adjustment device of the invention as represented in the above figures.

With the figures in view, it can be seen how the device of the invention is applicable to cutting tools materialized either as a pair of pruning shears 1 workable by two hands, as represented in FIG. 1, or as a pair of pruning shears 1' workable by just one hand, as represented in FIG. 11. In either case, both shears 1 and 1' have a cutting blade 3 and a cutting counter-blade 4, for the shears 1, while for the shears 1' the cutting blade and cutting counter-blade are referenced with 3' and 4', in which the blades 3-3' and 4-4' are extended in their corresponding arms 2 and 2', respectively, for grip and operation.

Both the cutting blade 3 and counter-blade 4 are provided with a hole 5 for the passage of a hinge bolt 6, in combination with a tightening nut 7, the latter being provided with the corresponding hole 8 for the passage of that bolt 6, and which moreover is provided with a cut 9 such that the said nut 7 is split, this cut connecting with the said hole 8 and which, via a locking screw 10, enables the adjustment to be carried out, due to said screw 10 being fitted in a threaded lateral hole 11 made in the actual split nut 7.

Figure 4:
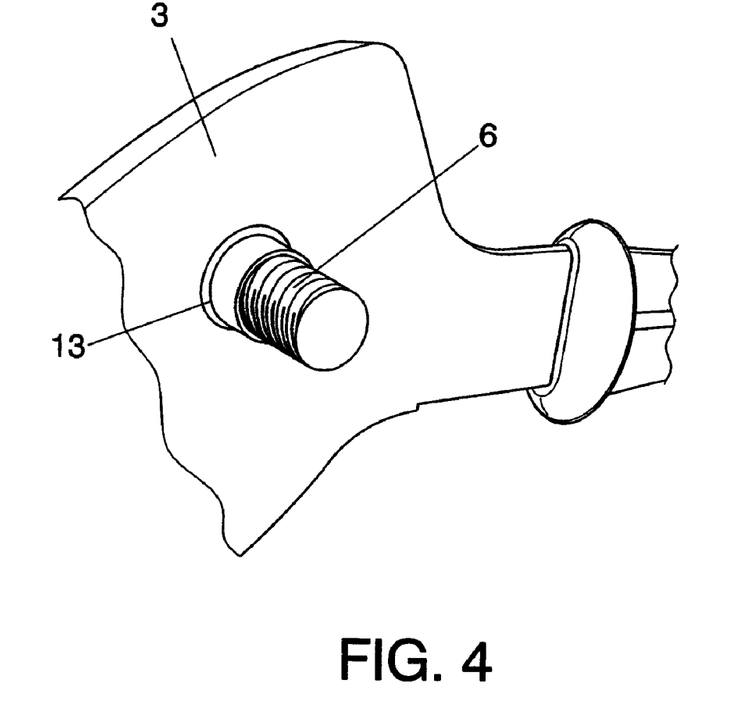
FIG. 4.—Shows a perspective view of the fitting of the bolt on the cutting counter-blade of the shears represented in FIG. 1.
Figure 5:
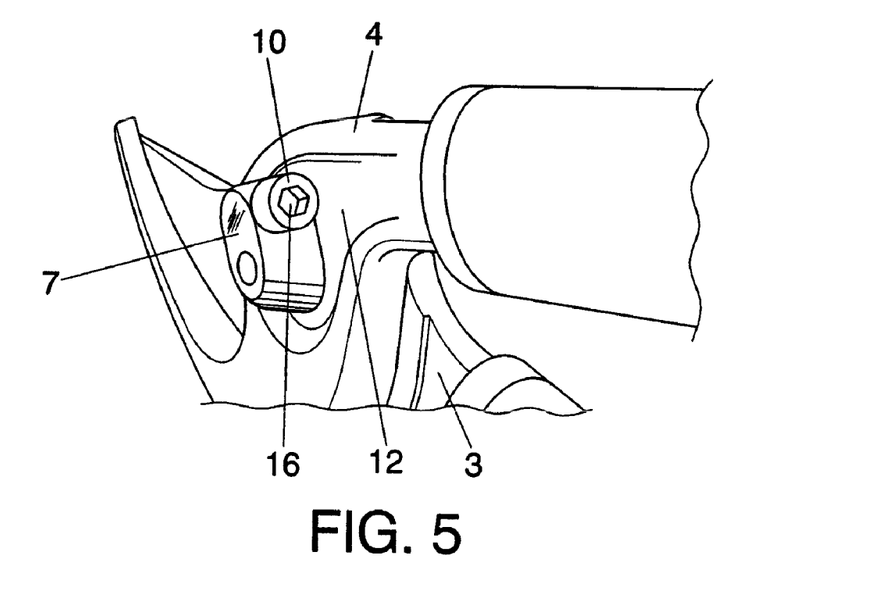
FIG. 5.—Shows a perspective view of the assembly of the device, where the external positioning can be seen of the split nut and the corresponding locking screw.
Figure 6:
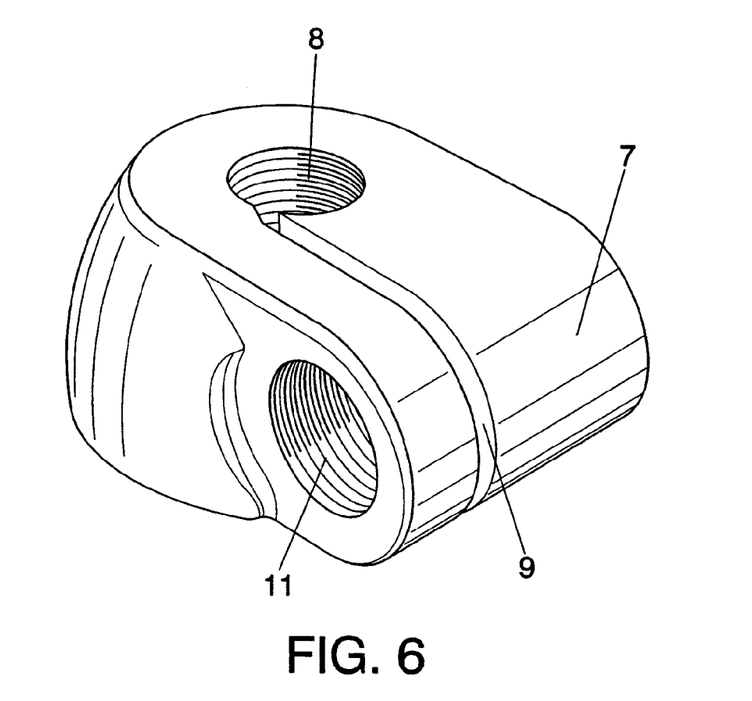
FIG. 6.—Shows a perspective view via the outer face of the split nut.

The head of the bolt 6 rests on the outer face of the cutting blade 3, while the nut 7 with its corresponding locking screw 10 is located via the outer face of the cutting counter-blade 4, the latter being provided with a recess 12 in that outer face for the positioning of the said nut 7 with its screw 10.

Evidently, in the case of shears 1' workable with just one hand, the corresponding supports of the blade and counter-blade 3' and 4' likewise have the hole 5 referred to above and provided for the passage of the bolt 6.

Figure 8:
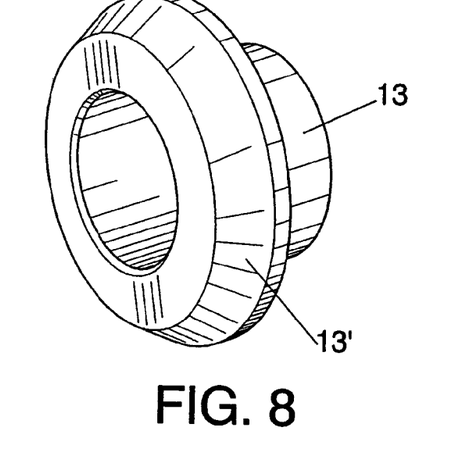
FIG. 8.—Shows a perspective view of the bush fitted on the hole of the cutting blade for the passage of the bolt.

With the aim of improving the passage and adjustment of the bolt 6 via the hole 5 of the blade 3 or, as the case might be, of the support for the cutting blade 3', provision has been made for a bushing 13 with one end projecting to order to form a beveled flange 13', as the maximum penetration buffer for the said bushing 13 in the hole 5 of the cutting blade 3.

Figure 3:
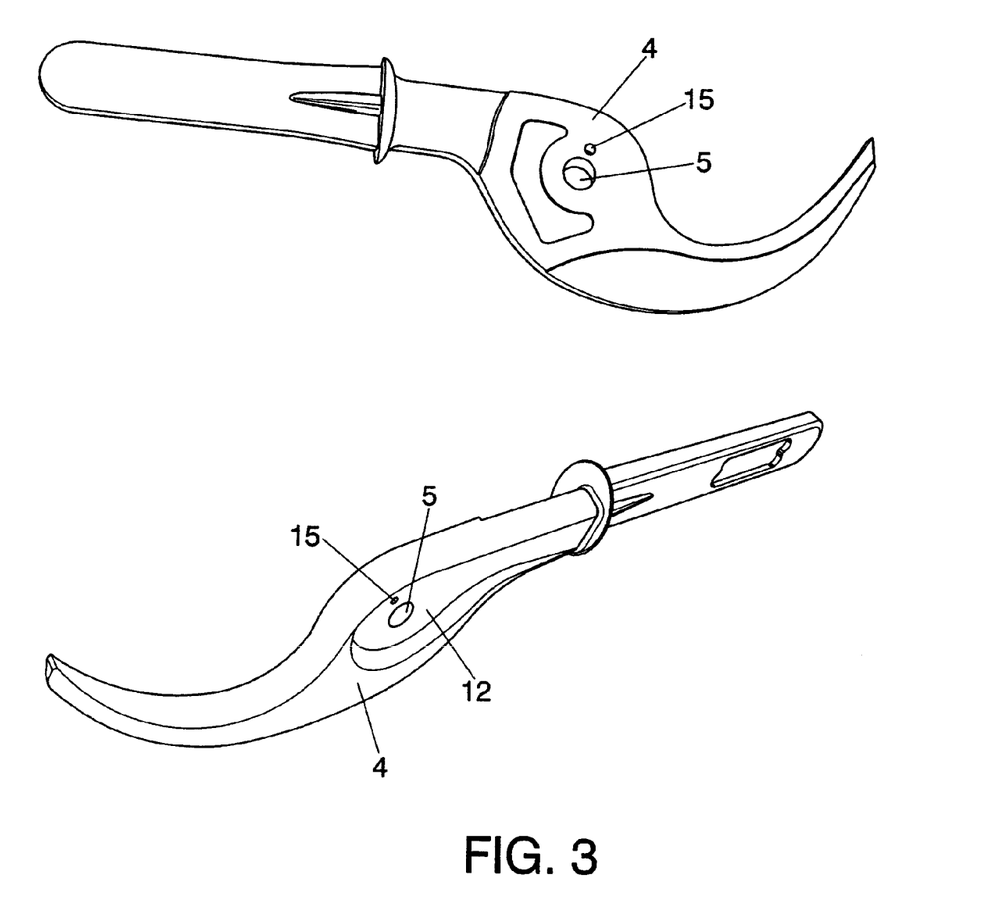
FIG. 3.—Shows perspective views from both sides of the cutting counter-blade of the shears represented in FIG. 1.
Figure 7:
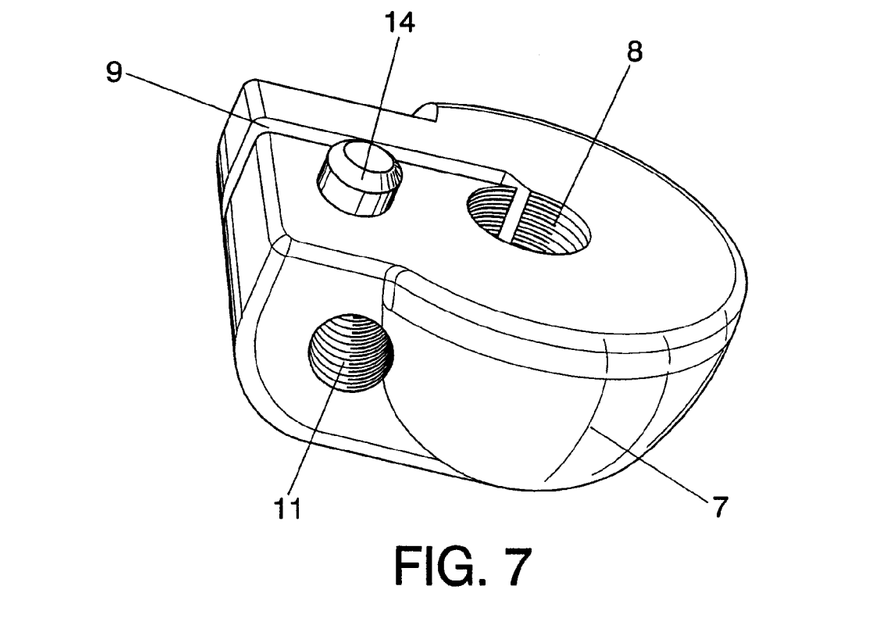
FIG. 7.—Shows a perspective view via the inner face of the same split nut represented in the previous figure.

For its part, the nut 7, as well as the holes 8 for screwing in the bolt 6 and for screwing in the locking screw 10, and as well as the cut 9 defining the splitting of the actual nut 7, also has in its inner face a protrusion or stud 14 intended for locating or housing a cavity 15 made in the inner face of the counter-blade 4 or, as the case might be, of the support for the counter-blade 4', with the aim of preventing the nut 7 from turning when it acts on the bolt 6.

Figure 9:
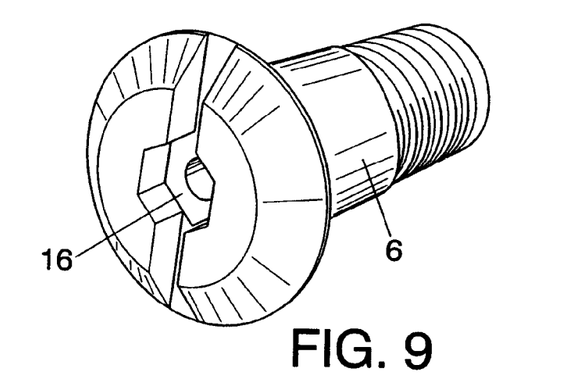
FIG. 9.—Shows a perspective view of the hinge bolt used in the device of the invention.
Figure 10:
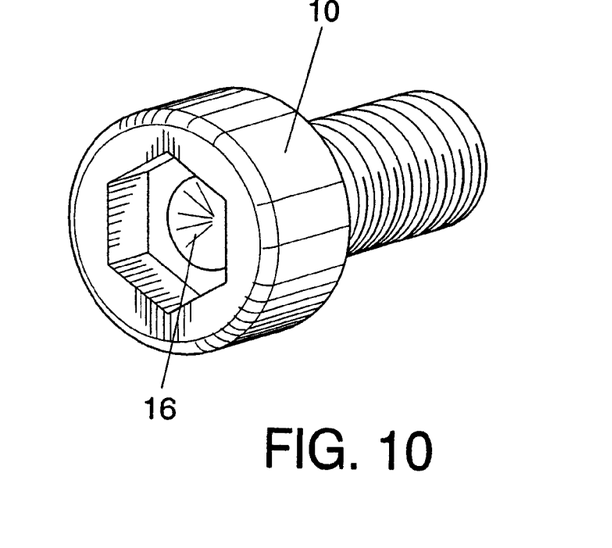
FIG. 10.—Shows a perspective view of the locking screw fitted on the split nut.

Both said bolt 6 and the locking screw 10 present the same slot 16 in their rotating head so that they can be rotated by means of a single commercially available tool, without any need for special tools as usually occurs conventionally.

FIGS. 9 and 10 show precisely that bolt 6 and locking screw 10, with their respective threaded sections for, in one case, the threading of the nut 7 and, in the other case, for screwing into the lateral hole 11 of the actual nut 7.

The screw 10 locks the bolt 6, in such a way that while the tool is being used, in this case the pruning shears 1 or 1', the movement of the cutting blades prevents the said nut 7 from being able to come unthreaded and consequently come away, or the blades from becoming out of adjustment due to the slackening of the bolt 6.

As already mentioned, the adjustment of the tightness is carried out by means of the locking screw 10, which is slackened and then the bolt 6 is rotated until the desired adjustment is achieved, with the said locking screw 10 then being tightened on the nut 7, in such a way that, when the cut 9 is closed due to tightening, the diameter of the hole 8 is, of course, reduced, and with it the tightening on the bolt 6.

Finally, it can be said that the locking screw 10 can be complemented with a safety washer.

The invention claimed is:

1. A device including: a cutting blade and a counter-blade, each one of the blades comprising a hole; a threaded bolt which passes through the holes of the cutting blade and the counter blade to hinge the cutting blade and counter-blade together; and a tightening nut;

wherein said tightening nut is a single unitary piece and further comprises a first threaded hole in which one end of the bolt is screwed, a second threaded hole, which runs perpendicular to the first threaded hole, a lateral locking screw being screwed in the second threaded hole, and a through slit, in communication with the first threaded hole, that extends from the first threaded hole through the second threaded hole to an outer edge of the nut, such that, when the lateral locking screw is screwed into the second threaded hole, an opening and a diameter of the first threaded hole is reduced allowing the threads of the bolt to interact with the threads of the first threaded hole.

2. The device of claim 1, wherein the bolt has a head with an indentation and the lateral locking screw has a head with an indentation equal in size to the bolt head indentation so that both the bolt and the lateral locking screw can be rotated by a single tool.

3. The device of claim 1, wherein an outer face of the counter-blade via which emerges the one end of the bolt, is provided with a recess for positioning of the tightening nut and the lateral locking screw.

4. The device of claim 3, wherein an inner face of the tightening nut has a protrusion housed in a complementary cavity located in the outer face of the counter-blade, such that said tightening nut is rotary blocked while the bolt is being turned.

5. The device of claim 3, wherein the hole of the cutting blade receives a bushing that receives said bolt in the hole.

6. The device of claim 3, wherein the bolt has a head with an indentation and the lateral locking screw has a head with an indentation equal in size to the bolt head indentation so that both the bolt and the lateral locking screw can be rotated by a single tool.

7. The device of claim 1, wherein an inner face of the tightening nut has a protrusion housed in a complementary cavity located in an outer face of the counter-blade, such that said tightening nut is rotary blocked while the bolt is being turned.

8. The device of claim 7, wherein the hole of the cutting blade receives a bushing that receives said bolt in the hole.

9. The device of claim 7, wherein the bolt has a head with an indentation and the lateral locking screw has a head with an indentation equal in size to the bolt head indentation so that both the bolt and the lateral locking screw can be rotated by a single tool.

10. The device of claim 1, wherein the hole of the cutting blade receives a bushing that receives said bolt in the hole.

11. The device of claim 10, wherein the bolt has a head with an indentation and the lateral locking screw has a head with an indentation equal in size to the bold head indentation so that both the bolt and the lateral locking screw can be rotated by a rotated by a single tool.

\* \* \* \* \*